United States Patent
Tie et al.

(10) Patent No.: US 8,751,792 B2
(45) Date of Patent: *Jun. 10, 2014

(54) METHOD AND SYSTEM FOR ENTITY PUBLIC KEY ACQUIRING, CERTIFICATE VALIDATION AND AUTHENTICATION BY INTRODUCING AN ONLINE CREDIBLE THIRD PARTY

(75) Inventors: Manxia Tie, Xi'an (CN); Jun Cao, Xi'an (CN); Zhenhai Huang, Xi'an (CN); Xiaolong Lai, Xi'an (CN)

(73) Assignee: China Iwncomm Co., Ltd., Xi'an (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/499,126

(22) PCT Filed: Dec. 14, 2009

(86) PCT No.: PCT/CN2009/075544
§ 371 (c)(1),
(2), (4) Date: Mar. 29, 2012

(87) PCT Pub. No.: WO2011/038559
PCT Pub. Date: Apr. 7, 2011

(65) Prior Publication Data
US 2012/0198240 A1    Aug. 2, 2012

(30) Foreign Application Priority Data

Sep. 30, 2009  (CN) .......................... 2009 1 0024191

(51) Int. Cl.
*H04L 29/06*  (2006.01)
(52) U.S. Cl.
USPC ........... 713/155; 713/168; 713/170; 713/176; 713/178; 726/2; 726/3; 726/9; 726/10
(58) Field of Classification Search
None
See application file for complete search history.

(56) References Cited

U.S. PATENT DOCUMENTS

| 5,491,750 A | 2/1996 | Bellare et al. |
| 7,080,251 B2 | 7/2006 | Fujishiro et al. |

(Continued)

FOREIGN PATENT DOCUMENTS

| CN | 1345498 | 4/2002 |
| CN | 1625103 A | 6/2005 |

(Continued)

OTHER PUBLICATIONS

Hiroyuki Sugiyama et al. "Design and Implementation of User-Authentication System in Distributed Systems." NTT R&D vol. 45, No. 1. 1996.

(Continued)

*Primary Examiner* — Pramila Parthasarathy
(74) *Attorney, Agent, or Firm* — Harness, Dickey & Pierce, P.L.C.

(57) ABSTRACT

A method and system for entity public key acquiring, certificate validation and authentication by introducing an online credible third party is disclosed. The method includes the following steps: 1) an entity B transmits a message 1 to an entity A; 2) the entity A transmits a message 2 to a credible third party TP after receiving the message 1; 3) the credible third party TP determines the response RepTA after receiving the message 2; 4) the credible third party TP returns a message 3 to the entity A; 5) the entity A returns a message 4 to the entity B after receiving the message 3; 6) the entity B receives the message 4; 7) the entity B transmits a message 5 to the entity A; 8) the entity A receives the message 5. The present invention can achieve public key acquisition, certificate validation and authentication of the entity by integrating them in one protocol, thereby facilitate the execution efficiency and the effect of the protocol and facilitate the combination with various public key acquisition and public key certificate state enquiry protocols. The present invention suits with a "user-access point-server" access network structure to meet the authentication requirement of the access network.

4 Claims, 2 Drawing Sheets

(56) References Cited

U.S. PATENT DOCUMENTS

| | | |
|---|---|---|
| 7,155,608 B1 | 12/2006 | Malik et al. |
| 7,266,684 B2 | 9/2007 | Jancula |
| 7,409,551 B2 | 8/2008 | Fujishiro et al. |
| 7,536,544 B2 * | 5/2009 | Xiao ............................. 713/158 |
| 7,697,692 B2 | 4/2010 | Takata et al. |
| 7,734,922 B2 | 6/2010 | Lee et al. |
| 7,765,396 B2 | 7/2010 | Haufe |
| 8,185,091 B2 | 5/2012 | Pang et al. |
| 8,195,935 B2 | 6/2012 | Tian et al. |
| 8,356,179 B2 | 1/2013 | Tie et al. |
| 8,412,943 B2 | 4/2013 | Pang et al. |
| 2002/0032654 A1 | 3/2002 | Egendorf |
| 2002/0164026 A1 | 11/2002 | Huima |
| 2004/0059685 A1 | 3/2004 | Sakamura et al. |
| 2005/0251691 A1 | 11/2005 | Haufe |
| 2005/0268096 A1 | 12/2005 | Kilian-Kehr et al. |
| 2006/0053296 A1 | 3/2006 | Busboom et al. |
| 2006/0095766 A1 | 5/2006 | Zhu et al. |
| 2006/0135141 A1 | 6/2006 | Wilson et al. |
| 2006/0143458 A1 | 6/2006 | Tie et al. |
| 2006/0281442 A1 | 12/2006 | Lee et al. |
| 2007/0055881 A1 | 3/2007 | Fuchs et al. |
| 2007/0150943 A1 | 6/2007 | Guo et al. |
| 2007/0289006 A1 | 12/2007 | Ramachandran et al. |
| 2010/0031031 A1 | 2/2010 | Tian et al. |

FOREIGN PATENT DOCUMENTS

| | | |
|---|---|---|
| CN | 1694395 | 11/2005 |
| CN | 1697373 A | 11/2005 |
| CN | 1700638 A | 11/2005 |
| CN | 1929380 A | 3/2007 |
| CN | 101009556 A | 8/2007 |
| CN | 101064605 A | 10/2007 |
| CN | 101145910 A | 3/2008 |
| CN | 101247223 A | 8/2008 |
| CN | 101364875 A | 2/2009 |
| CN | 101364876 A | 2/2009 |
| CN | 101394283 A | 3/2009 |
| CN | 101640593 A | 2/2010 |
| EP | 1601154 A1 | 11/2005 |
| JP | 8297638 A | 11/1996 |
| JP | 8335208 A | 12/1996 |
| JP | 2002072876 A | 3/2002 |
| JP | 2005535006 A | 11/2005 |
| JP | 2006505203 A | 2/2006 |
| JP | 2006238273 A | 9/2006 |
| JP | 2007274380 A | 10/2007 |
| RU | 2278477 C2 | 6/2006 |
| RU | 2295200 C2 | 3/2007 |
| WO | WO-03100544 A2 | 12/2003 |
| WO | WO-2006079953 A1 | 8/2006 |
| WO | WO-2006129934 A1 | 12/2006 |
| WO | WO-2007000179 A1 | 1/2007 |
| WO | WO-2007030213 A2 | 3/2007 |
| WO | WO-2007107708 A2 | 9/2007 |
| WO | WO-2007131426 A1 | 11/2007 |
| WO | WO-2008034360 A1 | 3/2008 |
| WO | WO-2009067902 A1 | 6/2009 |

OTHER PUBLICATIONS

"Survey on "Status of Identity Authentication Technologies."" Security Center of Information-technology Promotion Agency, Japan. Mar. 2003.

First Korean Office Action regarding Application No. 10-2012-7011077, dated Sep. 23, 2013. Translation provided by Unitalen Attorneys at Law.

A. Menezes et al. "Handbook of Applied Cryptography." Chapter 10 "Identification and Entity Authentication." Oct. 1996.

First Russian Office Action regarding Application No. 2010120133/08(028617), dated Aug. 17, 2011. Translation provided by Unitalen Attorneys At Law.

Dorot Vyacheslav et al. "Explanatory Dictionary on Modern Computer Vocabulary." 3rd edition. 2004. Translation provided by Unitalen Attorneys At Law.

Russian Decision on Grant Patent for Invention regarding Application No. 2010120133, dated Feb. 21, 2012. Translation provided by Unitalen Attorneys At Law.

IEEE Standards 802.11i. IEEE Standard for Information technology—Telecommunications and information exchange between systems—Local and metropolitan area networks—Specific requirements. Part 11: Wireless LAN Medium Access Control (MAC) and Physical Layer (PHY) specifications. Amendment 6: Medium Access Control (MAC) Security Enhancements. IEEE Computer Society. Jun. 24, 2004.

R.M. Needham & M.D. Schroeder. "Authentication Revisited." Jan. 1987.

Roger M. Needham and Michael D. Schroeder. "Using Encryption for Authentication in Large Networks of Computers." Communications of the ACM. vol. 21, No. 12. Dec. 1978.

Akihiro Yamamura. "Safety assessment of the ISO / IEC 9798 protocol." Graduate School of Engineering, AKita University Graduate School Resources. Feb. 4, 2011. Abstract translation provided by Unitalen Attorneys At Law.

International Search Report (in Chinese with English translation) and Written Opinion (in Chinese) for PCT/CN2009/075544, mailed Jun. 17, 2010; ISA/CN.

* cited by examiner

METHOD AND SYSTEM FOR ENTITY PUBLIC KEY ACQUIRING, CERTIFICATE VALIDATION AND AUTHENTICATION BY INTRODUCING AN ONLINE CREDIBLE THIRD PARTY

This application is a National Stage application of PCT/CN2009/075544 filed on Dec. 14, 2009, which claims the benefit of Chinese patent application No. 200910024191.4, entitled "METHOD FOR ENTITY PUBLIC KEY OBTAINING, CERTIFICATE VERIFICATION AND AUTHENTICATION WITH ONLINE TRUSTED THIRD PARTY AND SYSTEM THEREOF" and filed with the State Intellectual Property Office on Sep. 30, 2009. Both the international application and the Chinese application are incorporated herein by reference in their entirety.

FIELD OF THE INVENTION

The present invention relates to the field of network technology, and in particular to a method for entity public key obtaining, certificate verification and authentication with an online trusted third party and a system thereof.

BACKGROUND OF THE INVENTION

In a current computer network or communications network, for a user to login to and securely communicate on the network, entity authentication between the user and the network, either one-way or two-way, needs to be done. Generally, the mechanisms of authentication can be classified into two categories: symmetric-key algorithm based ones and public-key algorithm based ones.

The mechanisms of authentication based on a public-key algorithm and technique require a participating entity to have a pair of keys, i.e., a public-private key pair. The public key is distributed to the other participating entities. The distribution may be done in an out-of-band manner or a certificate based manner. The out-of-band manner is less used due to the difficulty of updating the key, while the certificate based manner is widely used.

Generally, the methods for entity authentication using a public key certificate are based on a public key infrastructure (PKI). PKI is a general security infrastructure that implements and provides security services based on the concepts and techniques of public key. PKI can provide security services including authentication, integrity and confidentiality. Two important concepts in PKI are public key certificate and certificate authority (CA). Generally, a public key certificate is issued by a CA, the signature in the public key certificate is signed by the CA, and the CA certifies the binding between a holder of the public key certificate and the public key of the holder by providing the signature.

Generally, the public key certificate certified by the CA has a period of validity, and the certificate becomes invalid after the expiration of the period of validity. If the private key that corresponds to the public key certificate is compromised, the public key certificate also becomes invalid. There are some other possibilities which may lead to invalidation of the public key certificate, such as job changes.

Figure 1:
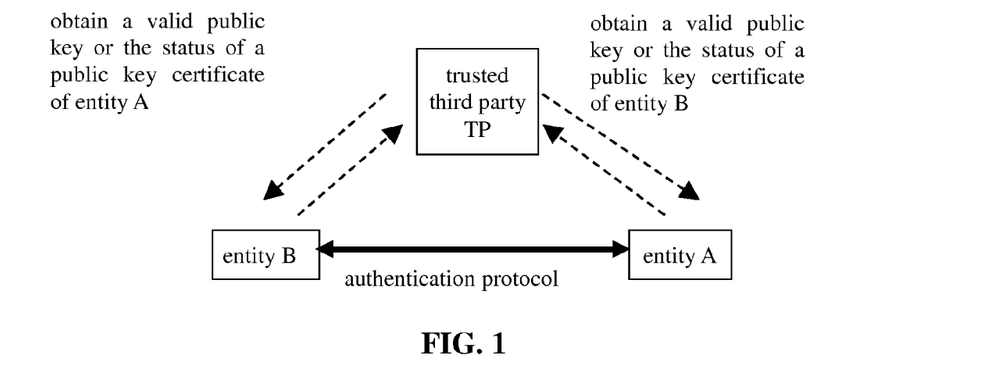
FIG. 1 is a schematic diagram illustrating the working principle of an authentication mechanism in the prior art.

In network communication, generally an entity that participates authentication will refuse to establish secure communication with an entity holding an invalid public key certificate; thus public key obtaining and certificate verification are associated with the entity authentication process and provide services for it. Currently, in existing mechanisms of authentication, before or during the execution of authentication, the verifier needs to either have a valid public key of the claimer, or know the status of a public key certificate of the claimer; otherwise, the authentication process will be subverted or will not be completed. As shown in FIG. 1, an entity A and an entity B need to execute an authentication protocol for authentication with each other, and a trusted third party (TP) is a third party entity that is trusted by both the entity A and the entity B. Before authentication, each of the entity A and the entity B needs to obtain a valid public key or the status of a public key certificate of its counterpart through the TP.

Currently, the status of a public key certificate can be obtained in the following two manners.

1) CRL: downloading a Certificate Revocation List (CRL), which may include downloading the entire list and downloading the increment of the list. For an entity to check the status of a certain public key certificate, the entity downloads the latest CRL from a server, and then checks whether the public key certificate to be verified is in the latest CRL.

2) Online inquiry. For example, Online Certificate Status Protocol (OCSP). Using a typical client/server structure, the OCSP mainly involves two entities: a client and a server. The client sends a request to the server, and the server returns a response. The request includes some certificates to be verified, and the response includes the statuses and verification intervals of these certificates.

The requirement of obtaining a valid public key or the status of a public key certificate of the counterpart in advance and cannot be met in many application scenarios, for example, in an access network with a tri-element structure including a user, an access point and a server, which may be seen in many communications networks, generally access control of the user is realized by an entity authentication mechanism; and before the authentication mechanism is completed, the user is not allowed to access the network, and thus cannot use the methods such as CRL and OCSP to verify the validity of a certificate of the access point or obtain a valid public key of the access point.

Moreover, in some applications, it is difficult for the user to use the methods such as CRL and OCSP during the authentication. Firstly, the user device may have a limited storage resource, or the user may simply do not want to store a CRL; thus it may not be practicable to periodically download the CRL. Even though the access network has no resource limitations, it may have the problems such as policy restrictions. Secondly, for a user to use an online inquiry mechanism such as OCSP, he needs to execute an independent, e.g., OCSP protocol by a backend server. This type of protocol normally runs over the Hypertext Transfer Protocol (HTTP) and is an application layer protocol; thus direct use of this type of protocol is complicated before the authentication of the access network is completed. Even if this type of protocol can be used, it is realized by the "user-server and access point-server" structure, which does not comply with the "user-access point-server" structure; thus this type of protocol cannot be used directly and conveniently.

SUMMARY OF THE INVENTION

In order to solve the technical problems described above, according to the present invention it is provided a method for entity public key obtaining, certificate verification and authentication with an online trusted third party and a system thereof, which comply with an access network's "user-access point-server" structure, and can meet authentication requirements of an access network.

The technical solution of the present invention includes:

According to an embodiment of the present invention, it is provided a method for entity public key obtaining, certificate verification and authentication with an online trusted third party, and the method includes:

1) sending, by an entity B, a message 1 to an entity A, the message 1 including a random number $R_B$, an identity identifier $ID_B$, a request ReqB and optional text Text1, wherein the request ReqB indicates that the entity B requests a valid public key or the status of a public key certificate of the entity A;

2) sending, by the entity A on receipt of the message 1, a message 2 to a trusted third party TP, the message 2 including a request ReqAT and optional text Text2, wherein the request ReqAT includes the content of the request ReqB, and the request ReqAT indicates that the entity A requests a valid public key or the status of a public key certificate of the entity B, and that the entity B requests a valid public key or the status of a public key certificate of the entity A;

3) checking, by the trusted third party TP on receipt of the message 2, the validity of public key certificates $Cert_A$ and $Cert_B$, according to identity identifiers $ID_A$ and $ID_B$ of the entity A and the entity B; or searching, by the trusted third party TP on receipt of the message 2, for valid public keys of the entity A and the entity B through respective entity distinguishers of the entity A and the entity B, and determining, by the trusted third party TP, a response RepTA, wherein the response RepTA includes the content of a response RepB, and the response RepTA indicates the valid public key or the status of the public key certificate of the entity A as well as the valid public key or the status of the public key certificate of the entity B determined by the trusted third party TP;

4) returning, by the trusted third party TP, a message 3 to the entity A, the message 3 including the response RepTA and optional text Text3;

5) returning, by the entity A on receipt of the message 3, a message 4 to the entity B, the message 4 including a random number $R_A$, an identity identifier $ID_A$, a token TokenAB, the response RepB and optional text Text5, wherein TokenAB=$sS_A$(RepB$\|R_A\|R_B\|$B$\|$A$\|$Text4), $sS_A$ is a signature signed by the entity A, and the response RepB indicates the valid public key or the status of the public key certificate of the entity A determined by the trusted third party TP;

6) performing, by the entity B, the following steps on receipt of the message 4:

6.1) verifying the response RepB according to a public key verification protocol or distribution protocol that is used, and performing step 6.2) if the verification is passed;

6.2) obtaining the public key or the status of the public key certificate of the entity A, verifying whether the signature signed by the entity A in the token TokenAB is correct and checking whether an entity distinguisher of the entity B is consistent with an entity distinguisher of the entity B included in signature data of the entity A in the token TokenAB, and if so, checking whether the random number $R_B$ generated by the entity B in the message 1 is consistent with the random number $R_B$ included in the signature data of the entity A in the token TokenAB, and if so, determining the authentication of the entity A by the entity B is passed and performing step 7);

7) sending, by the entity B, a message 5 to the entity A, the message 5 including a token TokenBA and optional text Text7, wherein TokenBA=$sS_B(R_A\|$A$\|$Text6), and $sS_B$ is a signature signed by the entity B;

8) performing, by the entity A, the following steps on receipt of the message 5:

8.1) verifying the response RepTA in the message 3 according to a public key verification protocol or distribution protocol that is used, and performing step 8.2) if the verification is passed;

8.2) obtaining the public key or the status of the public key certificate of the entity B, verifying whether the signature signed by the entity B in the token TokenBA is correct and checking whether an entity distinguisher of the entity A is consistent with an entity distinguisher of the entity A included in signature data of the entity B in the token TokenBA, and if so, checking whether the random number $R_A$ generated by the entity A in the message 4 is consistent with the random number $R_A$ included in the signature data of the entity B in the token TokenBA, and if so, determining the authentication of the entity B by the entity A is passed.

According to an embodiment of the present invention, it is also provided a method for entity public key obtaining, certificate verification and authentication with an online trusted third party, and the method includes:

1) sending, by an entity B, a message 1 to an entity A, the message 1 including a random number $R_B$, a request ReqB and optional text Text1, wherein the request ReqB indicates that the entity B requests a valid public key or the status of a public key certificate of the entity A;

2) sending, by the entity A on receipt of the message 1, a message 2 to a trusted third party TP, the message 2 including a request ReqAT and optional text Text2, wherein the request ReqAT equals to the content of the request ReqB, and the request ReqAT indicates that the entity B requests a valid public key or the status of a public key certificate of the entity A;

3) checking, by the trusted third party TP on receipt of the message 2, the validity of a public key certificate $Cert_A$ according to an identity identifier $ID_A$ of the entity A; or searching, by the trusted third party TP on receipt of the message 2, for a valid public key of the entity A through an entity distinguisher of the entity A, and determining, by the trusted third party TP, a response RepTA, wherein the response RepTA equals to the content of a response RepB, and the response RepTA indicates the valid public key or the status of the public key certificate of the entity A determined by the trusted third party TP;

4) returning, by the trusted third party TP, a message 3 to the entity A, the message 3 including the response RepTA and optional text Text3;

5) returning, by the entity A on receipt of the message 3, a message 4 to the entity B, the message 4 including an identity identifier $ID_A$, a token TokenAB, the response RepB and optional text Text5, wherein TokenAB=$sS_A$(RepB$\|R_B\|$A$\|$Text4), and $sS_A$ is a signature signed by the entity A;

6) performing, by the entity B, the following steps on receipt of the message 4:

6.1) verifying the response RepB according to a public key verification protocol or distribution protocol that is used, and performing step 6.2) if the verification is passed;

6.2) obtaining the public key or the status of the public key certificate of the entity A, verifying whether the signature signed by the entity A in the token TokenAB is correct and checking whether the random number $R_B$ generated by the entity B in the message 1 is consistent with the random number $R_B$ included in signature data of the entity A in the token TokenAB, and if so, determining the authentication of the entity A by the entity B is passed.

According to an embodiment of the present invention, it is provided a system for entity public key obtaining, certificate verification and authentication with an online trusted third party, and the system includes an entity A, an entity B and the trusted third party, the trusted third party includes a response RepTA generation unit, which is adapted to generate a response RepTA and send the response RepTA to the entity A;

the entity A includes a verification unit for verifying the identity of the entity B, which is adapted to verify the response RepTA according to a public key verification protocol or distribution protocol that is used; obtain a public key or the status of a public key certificate of the entity B if the verification is passed; verify whether a signature signed by the entity B in a token TokenBA is correct and check whether an entity distinguisher of the entity A is consistent with an entity distinguisher of the entity A included in signature data of the entity B in the token TokenBA; and if so, check whether a random number $R_A$ generated by the entity A in a message 4 is consistent with a random number $R_A$ included in the signature data of the entity B in the token TokenBA; and if so, determine the verification of the identity of the entity B is passed;

the entity B includes a verification unit for verifying the identity of the entity A, which is adapted to verify a response RepB according to a public key verification protocol or distribution protocol that is used; obtain a public key or the status of a public key certificate of the entity A if the verification is passed; verify whether a signature signed by the entity A in a token TokenAB is correct and check whether an entity distinguisher of the entity B is consistent with an entity distinguisher of the entity B included in signature data of the entity A in the token TokenAB; and if so, check whether a random number $R_B$ generated by the entity B in a message 1 is consistent with a random number $R_B$ included in the signature data of the entity A in the token TokenAB; and if so, determine the verification of the identity of the entity A is passed.

According to an embodiment of the present invention, it is also provided a system for entity public key obtaining, certificate verification and authentication with an online trusted third party, and the system includes an entity A, an entity B and the trusted third party, the trusted third party includes a response RepTA generation unit, which is adapted to generate a response RepTA and send the response RepTA to the entity A;

the entity B includes a verification unit for verifying the identity of the entity A, which is adapted to verify a response RepB according to a public key verification protocol or distribution protocol that is used; obtain a public key or the status of a public key certificate of the entity A if the verification is passed; verify whether a signature signed by the entity A in a token TokenAB is correct and check whether a random number $R_B$ generated by the entity B in a message 1 is consistent with a random number $R_B$ included in signature data of the entity A in the token TokenAB; and if so, determine the verification of the identity of the entity A is passed.

The embodiments of the present invention adopt a tri-entity structure. Before authentication, each of the entity A and the entity B obtains a public key or certificate of the trusted third party, and obtains a user certificate issued to it by the trusted third party or distributes its public key to the trusted third party, eliminating the need to know the valid public key or the status of the public key certificate of its counterpart in advance. The present invention incorporates the functions of entity public key obtaining, certificate verification and authentication in a single protocol, which is beneficial for improvement in efficiency and performance of the protocol, may facilitate compatibility with various public key obtaining and public key certificate status inquiry protocols, is applicable to an access network's "user-access point-server" structure, and can meet authentication requirements of an access network.

DETAILED DESCRIPTION OF THE INVENTION

The method according to an embodiment of the present invention involves three security elements, i.e., two entities A and B and a trusted third party TP. Through the online trusted third party TP, the entities A and B perform authentication with each other, and obtain the valid public key or the status of the public key certificate of their counterparts. The entity A can communicate directly with the trusted third party TP, while the entity B can communicate with the trusted third party TP only through the entity A.

For illustrative purposes, the denotations are defined as below.

For an entity X with X being either A or B, Rx denotes the random number generated by the entity X; $Cert_X$ is the public key certificate of the entity X; $ID_X$ is the identity identifier of the entity X, and is represented by the certificate $Cert_X$ or the entity distinguisher X; ReqX denotes the request generated by the entity X, and is used to request information such as the valid public key or the status of the public key certificate of the counterpart; ReqXT denotes the request generated or forwarded by the entity X to the trusted third party TP; RepX denotes the response sent to the entity X against ReqX, i.e., to respond to the entity X with information such as the valid public key or the status of the public key certificate of the entity that is requested by the entity X; RepTX denotes the response generated by the trusted third party TP against ReqXT, i.e., the trusted third party TP responds to the entity X with information such as the valid public key or the status of the public key certificate of the entity that is requested directly by the entity X or requested in a request forwarded by the entity X; Token is a field for the token; Text is an optional text field; and $sS_X$ denotes the signature signed by the entity X. The form and definition of ReqB, ReqAT, RepTA and RepB may be determined according to a particular public key verification or distribution protocol that is used, and the online public key verification or distribution protocol may include certificate status protocol (see GB/T 19713), server based certificate verification protocol (see IETF RFC5055) and other public key verification or distribution protocols.

Figure 2:
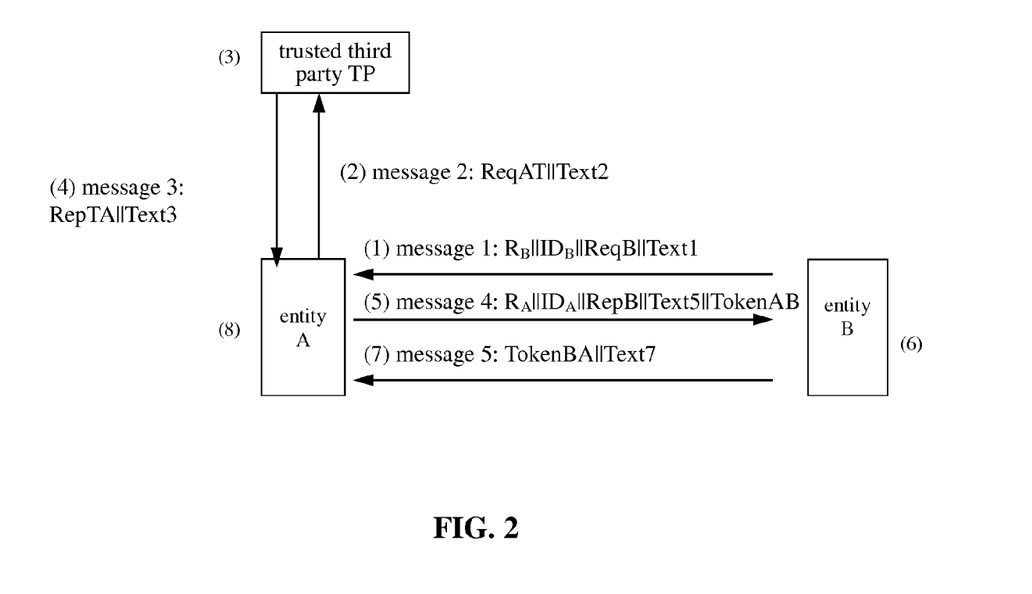
FIG. 2 is a schematic diagram illustrating a method according to an embodiment of the present invention.

As shown in FIG. 2, the method for entity public key obtaining, certificate verification and authentication with an online trusted third party according to an embodiment of the present invention includes the following steps:

1) sending, by an entity B, a message 1 to an entity A, the message 1 including a random number $R_B$, an identity identifier $ID_B$, a request ReqB and optional text Text1, wherein the request ReqB indicates that the entity B requests a valid public key or the status of a public key certificate of its counterpart (i.e., the entity A);

2) sending, by the entity A on receipt of the message 1, a message 2 to a trusted third party TP, the message 2 including a request ReqAT and optional text Text2, wherein the request ReqAT includes the content of the request ReqB, and the request ReqAT indicates that the entity A requests a valid public key or the status of a public key certificate of the entity B, and that the entity B requests a valid public key or the status of a public key certificate of the entity A;

3) checking, by the trusted third party TP on receipt of the message 2, the validity of public key certificates $Cert_A$ and $Cert_B$, according to identity identifiers $ID_A$ and $ID_B$ of the entity A and the entity B; or searching, by the trusted third party TP on receipt of the message 2, for valid public keys of the entity A and the entity B through entity distinguishers A and B, and determining, by the trusted third party TP, a response RepTA, wherein the response RepTA includes the content of a response RepB, and the response RepTA indicates the valid public key or the status of the public key certificate of the entity A as well as the valid public key or the status of the public key certificate of the entity B determined by the trusted third party TP;

4) returning, by the trusted third party TP, a message 3 to the entity A, the message 3 including the response RepTA and optional text Text3;

5) returning, by the entity A on receipt of the message 3, a message 4 to the entity B, the message 4 including a random number $R_A$, an identity identifier $ID_A$, a token TokenAB, the response RepB and optional text Text5, wherein TokenAB=$sS_A$(RepB||$R_A$||$R_B$||B||A||Text4), and the response RepB indicates the valid public key or the status of the public key certificate of the entity A determined by the trusted third party TP;

6) performing, by the entity B, the following steps on receipt of the message 4:

6.1) verifying the response RepB according to a public key verification protocol or distribution protocol that is used, and performing step 6.2) if the verification is passed;

6.2) obtaining the public key or the status of the public key certificate of the entity A, verifying whether the signature signed by the entity A in the token TokenAB is correct and checking whether a distinguisher of the entity B is consistent with an entity distinguisher (B) included in signature data of the entity A in the token TokenAB, and if so, checking whether the random number $R_B$ generated by the entity B in the message 1 is consistent with the random number $R_B$ included in the signature data of the entity A in the token TokenAB, and if so, determining the authentication of the entity A by the entity B is passed and performing step 7);

7) sending, by the entity B, a message 5 to the entity A, the message 5 including a token TokenBA and optional text Text7, wherein TokenBA=$sS_B$($R_A$||A||Text6);

8) performing, by the entity A, the following steps on receipt of the message 5:

8.1) verifying the response RepTA in the message 3 according to a public key verification protocol or distribution protocol that is used, and performing step 8.2) if the verification is passed;

8.2) obtaining the public key or the status of the public key certificate of the entity B, verifying whether the signature signed by the entity B in the token TokenBA is correct and checking whether a distinguisher A of the entity A is consistent with an entity distinguisher (A) included in signature data of the entity B in the token TokenBA, and if so, checking whether the random number $R_A$ generated by the entity A in the message 4 is consistent with the random number $R_A$ included in the signature data of the entity B in the token TokenBA, and if so, determining the authentication of the entity B by the entity A is passed.

In the above embodiment, step 8.1) may be advanced to be within step 5), i.e., on receipt of the message 3, the entity A performs firstly the step 8.1), and then sends the message 4 to the entity B. And a time stamp or a serial number may be used in place of the random numbers $R_A$ and $R_B$.

In a practical application using the authentication system, generally the entity B may reside on a user communication terminal, and the entity A may reside on a network access point. By the method for two-way authentication between the entity B and the entity A according to the embodiment above, two-way verification of validity between the user and the network access point can be realized, thus ensuring a legitimate user to access a legitimate network.

Figure 3:
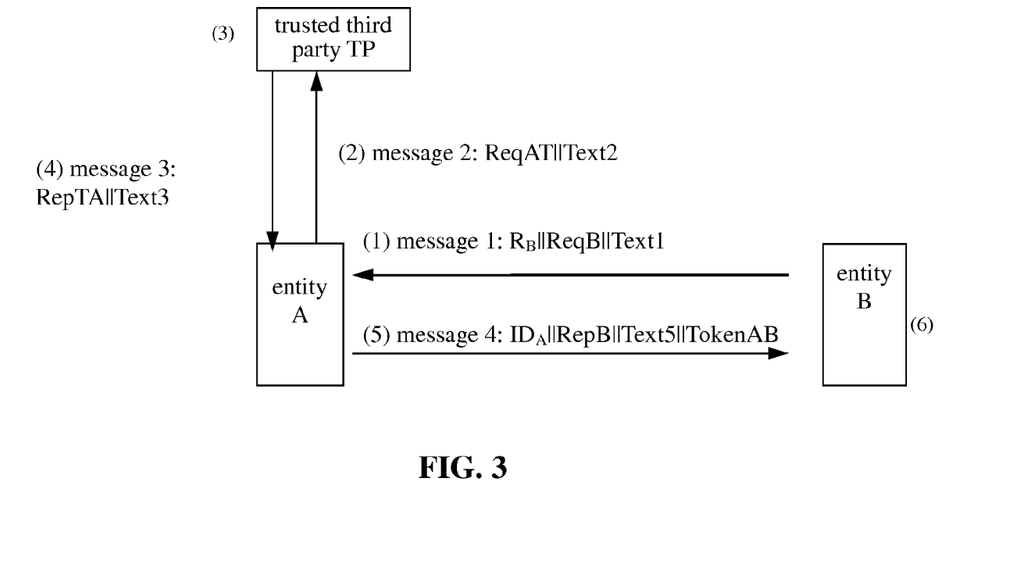
FIG. 3 is a schematic diagram illustrating a method according to another embodiment of the present invention.

In a practical application, sometimes it only needs to ensure the network for the user to access is legitimate. In this case, the method according to the above embodiment may be modified, i.e., to cancel the message 5, simplify the content of the messages 1 to 4, and omit the steps 7) and 8), thus realizing one-way authentication of the entity A by the entity B. As shown in FIG. 3, a detailed process includes the following steps.

1) sending, by an entity B, a message 1 to an entity A, the message 1 including a random number $R_B$, a request ReqB and optional text Text1, wherein the request ReqB indicates that the entity B requests a valid public key or the status of a public key certificate of its counterpart (i.e., the entity A);

2) sending, by the entity A on receipt of the message 1, a message 2 to a trusted third party TP, the message 2 including a request ReqAT and optional text Text2, wherein the request ReqAT equals to the content of the request ReqB, and the request ReqAT indicates that the entity B requests a valid public key or the status of a public key certificate of the entity A;

3) checking, by the trusted third party TP on receipt of the message 2, the validity of a public key certificate $Cert_A$ according to an identity identifier $ID_A$ of the entity A; or searching, by the trusted third party TP on receipt of the message 2, for a valid public key of the entity A through an entity distinguisher A, and determining, by the trusted third party TP, a response RepTA, wherein the response RepTA equals to the content of a response RepB, and the response RepTA indicates the valid public key or the status of the public key certificate of the entity A determined by the trusted third party TP;

4) returning, by the trusted third party TP, a message 3 to the entity A, the message 3 including the response RepTA and optional text Text3;

5) returning, by the entity A on receipt of the message 3, a message 4 to the entity B, the message 4 including an identity identifier $ID_A$, a token TokenAB, the response RepB and optional text Text5, wherein TokenAB=$sS_A$(RepB||$R_B$||A||Text4);

6) performing, by the entity B, the following steps on receipt of the message 4:

6.1) verifying the response RepB according to a public key verification protocol or distribution protocol that is used, and performing step 6.2) if the verification is passed;

6.2) obtaining the public key or the status of the public key certificate of the entity A, verifying whether the signature signed by the entity A in the token TokenAB is correct and checking whether the random number $R_B$ generated by the entity B in the message 1 is consistent with the random number $R_B$ included in signature data of the entity A in the token TokenAB, and if so, determining the authentication of the entity A by the entity B is passed.

The present invention also provides a system for entity public key obtaining, certificate verification and authentication with an online trusted third party, and the system includes an entity A, an entity B and the trusted third party. The trusted third party includes a response RepTA generation unit. The trusted third party generates a response RepTA and sends it to the entity A through the response RepTA generation unit. The entity A includes a verification unit for verifying the identity of the entity B. The verification unit for verifying the identity of the entity B verifies the response RepTA according to a public key verification protocol or distribution protocol that is used; obtains a public key or the status of a public key certificate of the entity B if the verification is passed; verifies whether a signature signed by the entity B in a token TokenBA is correct and checks whether a distinguisher A of the entity A is consistent with an entity distinguisher (A) included in signature data of the entity B in the token TokenBA; and if so, checks whether a random number $R_A$ generated by the entity A in a message 4 is consistent with a random number $R_A$ included in the signature data of the entity B in the token TokenBA; and if so, determines the verification of the identity of the entity B is passed. The entity B includes a verification unit for verifying the identity of the entity A. The verification unit for verifying the identity of the entity A verifies a response RepB according to a public key verification protocol or distribution protocol that is used; obtains a public key or the status of a public key certificate of the entity A if the verification is passed; verifies whether a signature signed by the entity A in a token TokenAB is correct and checks whether a distinguisher of the entity B is consistent with an entity distinguisher (B) included in signature data of the entity A in the token TokenAB; and if so, checks whether a random number $R_B$ generated by the entity B in a message 1 is consistent with a random number $R_B$ included in the signature data of the entity A in the token TokenAB; and if so, determines the verification of the identity of the entity A is passed.

The present invention also provides a system for entity public key obtaining, certificate verification and authentication with an online trusted third party, and the system includes an entity A, an entity B and the trusted third party. The trusted third party includes a response RepTA generation unit. The trusted third party generates a response RepTA and sends it to the entity A through the response RepTA generation unit. The entity B includes a verification unit for verifying the identity of the entity A. The verification unit for verifying the identity of the entity A verifies a response RepB according to a public key verification protocol or distribution protocol that is used; obtains a public key or the status of a public key certificate of the entity A if the verification is passed; verifies whether a signature signed by the entity A in a token TokenAB is correct and checks whether a random number $R_B$ generated by the entity B in a message 1 is consistent with a random number $R_B$ included in signature data of the entity A in the token TokenAB; and if so, determines the verification of the identity of the entity A is passed.

The denotations used in the above embodiments such as entities A and B, random numbers $R_A$ and $R_B$, messages 1 to 5, optional text 1 to 5, and identity identifiers, requests and responses, are for illustrative purposes only and merely distinguish items with the same property (e.g., two entities), which thus shall not be interpreted as limiting the present invention.

The method for entity public key obtaining, certificate verification and authentication with an online trusted third party and a system thereof provided by the present invention are described above. Specific embodiments are used in the description of the principle and implementation of the present invention. It is noted that the description of the embodiments are merely for better understanding of the method and its basic idea of the present invention; and modifications may be made by those skilled in the art to the embodiments and applications of the present invention based on the idea of the present invention. Therefore, the content of the description shall not be interpreted as limiting the present invention.

The invention claimed is:

1. A method for obtaining entity public key, certificate verification and authentication with an online trusted third party, wherein the method comprises:

1) sending, by an entity B, a message 1 to an entity A, the message 1 comprising a random number $R_B$, an identity identifier $ID_B$, a request ReqB and optional text Text1, wherein the request ReqB indicates that the entity B requests a valid public key or a status of a public key certificate of the entity A;

2) sending, by the entity A on receipt of the message 1, a message 2 to a trusted third party TP, the message 2 comprising a request ReqAT and optional text Text2, wherein the request ReqAT comprises a content of the request ReqB, and the request ReqAT indicates that the entity A requests a valid public key or the status of a public key certificate of the entity B, and that the entity B requests a valid public key or the status of a public key certificate of the entity A;

3) checking, by the trusted third party TP on receipt of the message 2, a validity of public key certificates $Cert_A$ and $Cert_B$, according to identity identifiers $ID_A$ and $ID_B$ of the entity A and the entity B; or searching, by the trusted third party TP on receipt of the message 2, for valid public keys of the entity A and the entity B through respective entity distinguishers of the entity A and the entity B, and determining, by the trusted third party TP, a response RepTA, wherein the response RepTA comprises the content of a response RepB, and the response RepTA indicates the valid public key or the status of the public key certificate of the entity A as well as the valid public key or the status of the public key certificate of the entity B determined by the trusted third party TP;

4) returning, by the trusted third party TP, a message 3 to the entity A, the message 3 comprising the response RepTA and optional text Text3;

5) returning, by the entity A on receipt of the message 3, a message 4 to the entity B, the message 4 comprising a random number $R_A$, an identity identifier $ID_A$, a token TokenAB, the response RepB and optional text Text5, wherein TokenAB=$sS_A$(RepB∥$R_A$∥$R_B$∥B∥A∥Text4), $sS_A$ is a signature signed by the entity A, and the response RepB indicates the valid public key or the status of the public key certificate of the entity A determined by the trusted third party TP;

6) performing, by the entity B, the following steps on receipt of the message 4:
   6.1) verifying the response RepB according to a public key verification protocol or distribution protocol that is used, and performing step 6.2) if the verification is passed;
   6.2) obtaining the public key or the status of the public key certificate of the entity A,
   verifying whether the signature signed by the entity A in the token TokenAB is correct and checking whether an entity distinguisher of the entity B is consistent with an entity distinguisher of the entity B comprised in signature data of the entity A in the token TokenAB, and
   if so, checking whether the random number $R_B$ generated by the entity B in the message 1 is consistent with the random number $R_B$ comprised in the signature data of the entity A in the token TokenAB, and
   if so, determining the authentication of the entity A by the entity B is passed and performing step 7);
7) sending, by the entity B, a message 5 to the entity A, the message 5 comprising a token TokenBA and optional text Text7, wherein TokenBA=$sS_B(R_A\|A\|Text6)$, and $sS_B$ is a signature signed by the entity B;
8) performing, by the entity A, the following steps on receipt of the message 5:
   8.1) verifying the response RepTA in the message 3 according to a public key verification protocol or distribution protocol that is used, and performing step 8.2) if the verification is passed;
   8.2) obtaining the public key or the status of the public key certificate of the entity B,
   verifying whether the signature signed by the entity B in the token TokenBA is correct and checking whether an entity distinguisher of the entity A is consistent with an entity distinguisher of the entity A comprised in signature data of the entity B in the token TokenBA, and
   if so, checking whether the random number $R_A$ generated by the entity A in the message 4 is consistent with the random number $R_A$ comprised in the signature data of the entity B in the token TokenBA, and
   if so, determining the authentication of the entity B by the entity A is passed; and
   wherein the entity B resides on a user communication terminal.

2. A method for obtaining entity public key, certificate verification and authentication with an online trusted third party, wherein the method comprises:
   1) sending, by an entity B, a message 1 to an entity A, the message 1 comprising a random number $R_B$, a request ReqB and optional text Text1, wherein the request ReqB indicates that the entity B requests a valid public key or a status of a public key certificate of the entity A;
   2) sending, by the entity A on receipt of the message 1, a message 2 to a trusted third party TP, the message 2 comprising a request ReqAT and optional text Text2, wherein the request ReqAT equals to a content of the request ReqB, and the request ReqAT indicates that the entity B requests a valid public key or the status of a public key certificate of the entity A;
   3) checking, by the trusted third party TP on receipt of the message 2, the validity of a public key certificate $Cert_A$ according to an identity identifier $ID_A$ of the entity A; or searching, by the trusted third party TP on receipt of message 2, for a valid public key of the entity A through an entity distinguisher of the entity A, and determining, by the trusted third party TP, a response RepTA, wherein the response RepTA equals to the content of a response RepB, and the response RepTA indicates the valid public key or the status of the public key certificate of the entity A determined by the trusted third party TP;
   4) returning, by the trusted third party TP, a message 3 to the entity A, the message 3 comprising the response RepTA and optional text Text3;
   5) returning, by the entity A on receipt of the message 3, a message 4 to the entity B, the message 4 comprising an identity identifier $ID_A$, a token TokenAB, the response RepB and optional text Text5, wherein TokenAB=$sS_A(RepB\|R_B\|A\|Text4)$, and $sS_A$ is a signature signed by the entity A;
   6) performing, by the entity B, the following steps on receipt of the message 4:
      6.1) verifying the response RepB according to a public key verification protocol or distribution protocol that is used, and performing step 6.2) if the verification is passed;
      6.2) obtaining the public key or the status of the public key certificate of the entity A,
      verifying whether the signature signed by the entity A in the token TokenAB is correct and checking whether the random number $R_B$ generated by the entity B in the message 1 is consistent with the random number $R_B$ comprised in signature data of the entity A in the token TokenAB, and
      if so, determining the authentication of the entity A by the entity B is passed; and
      wherein the entity B resides on a user communication terminal.

3. A system for obtaining entity public key, certificate verification and authentication with an online trusted third party, wherein the system comprises an entity A, an entity B and the trusted third party,
   the trusted third party comprises a response RepTA generation unit, which is adapted to generate a response RepTA and send the response RepTA to the entity A;
   the entity A comprises a verification unit for verifying an identity of the entity B, which is adapted to verify the response RepTA according to a public key verification protocol or distribution protocol that is used; obtain a public key or a status of a public key certificate of the entity B if the verification is passed; verify whether a signature signed by the entity B in a token TokenBA is correct and check whether an entity distinguisher of the entity A is consistent with an entity distinguisher of the entity A comprised in signature data of the entity B in the token TokenBA; and if so, check whether a random number $R_A$ generated by the entity A in a message 4 is consistent with a random number $R_A$ comprised in the signature data of the entity B in the token TokenBA; and if so, determine the verification of the identity of the entity B is passed;
   the entity B comprises a verification unit for verifying the identity of the entity A, which is adapted to verify a response RepB according to a public key verification protocol or distribution protocol that is used; obtain a public key or the status of a public key certificate of the entity A if the verification is passed; verify whether a signature signed by the entity A in a token TokenAB is correct and check whether an entity distinguisher of the entity B is consistent with an entity distinguisher of the entity B comprised in signature data of the entity A in the token TokenAB; and if so, check whether a random number $R_B$ generated by the entity B in a message 1 is consistent with a random number $R_B$ comprised in the signature data of the entity A in the token TokenAB; and if so, determine the verification of the identity of the entity A is passed; and wherein the entity B resides on a user communication terminal.

4. A system for obtaining entity public key, certificate verification and authentication with an online trusted third party, wherein the system comprises an entity A, an entity B and the trusted third party, the trusted third party comprises a response RepTA generation unit, which is adapted to generate a response RepTA and send the response RepTA to the entity A, wherein the response RepTA indicates a valid public key or a status of a public key certificate;

the entity B comprises a verification unit for verifying an identity of the entity A, which is adapted to verify a response RepB according to a public key verification protocol or distribution protocol that is used; obtain a public key or the status of a public key certificate of the entity A if the verification is passed; verify whether a signature signed by the entity A in a token TokenAB is correct and check whether a random number $R_B$ generated by the entity B in a message 1 is consistent with a random number $R_B$ comprised in signature data of the entity A in the token TokenAB; and if so, determine the verification of the identity of the entity A is passed; and wherein the entity B resides on a user communication terminal.

* * * * *